United States Patent
Barve

(10) Patent No.: US 6,845,235 B1
(45) Date of Patent: Jan. 18, 2005

(54) METHOD AND APPARATUS IN A WIRELESS COMMUNICATION SYSTEM FOR EXPEDITING A REQUEST FOR UPLINK RESOURCES

(75) Inventor: Satyen D. Barve, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 18 days.

(21) Appl. No.: 10/623,287

(22) Filed: Jul. 18, 2003

(51) Int. Cl.[7] .............................................. H04Q 7/12
(52) U.S. Cl. ............................... 455/412.1; 455/412.2; 370/310; 370/352
(58) Field of Search ............................... 455/412, 437, 455/442, 517, 525, 436; 370/310, 349, 338, 324, 337, 329, 352, 333

(56) References Cited

U.S. PATENT DOCUMENTS

| | | | | |
|---|---|---|---|---|
| 5,313,655 A | * | 5/1994 | Sasuta | 455/509 |
| 5,818,824 A | * | 10/1998 | Lu et al. | 370/328 |
| 5,845,202 A | * | 12/1998 | Davis | 455/412.2 |
| 6,035,196 A | * | 3/2000 | Hengeveld et al. | 455/437 |
| 6,377,560 B1 | * | 4/2002 | Dailey | 370/329 |
| 6,400,695 B1 | * | 6/2002 | Chuah et al. | 370/310 |
| 6,792,284 B1 | * | 9/2004 | Dalsgaard et al. | 455/525 |
| 2001/0038614 A1 | * | 11/2001 | Hautamaki et al. | 370/324 |
| 2002/0054596 A1 | * | 5/2002 | Sengodan | 370/395.21 |
| 2002/0080758 A1 | * | 6/2002 | Landais | 370/338 |
| 2002/0082033 A1 | * | 6/2002 | Lohtia et al. | 455/517 |
| 2002/0136206 A1 | * | 9/2002 | Gallant et al. | 370/352 |
| 2002/0150064 A1 | * | 10/2002 | Lucidarme | 370/333 |
| 2002/0181422 A1 | * | 12/2002 | Parantainen et al. | 370/337 |
| 2003/0060235 A1 | * | 3/2003 | Yamato et al. | 455/561 |
| 2003/0142657 A1 | * | 7/2003 | Forssell | 370/347 |
| 2004/0047343 A1 | * | 3/2004 | Muniere | 370/352 |
| 2004/0153706 A1 | * | 8/2004 | Cayla | 714/4 |

* cited by examiner

*Primary Examiner*—Nick Corsaro
*Assistant Examiner*—Tan Trinh

(57) ABSTRACT

A base station (400) and corresponding method (300) sends (302) a first request for an acknowledgment message from a mobile unit (502), the acknowledgment message including an uplink channel request when needed by the mobile unit. The base station determines (304) an expected time for receiving the acknowledgment message. In response to not receiving the acknowledgment message by the expected time, the base station conditionally sends (308) a speculative packet access reject message to the mobile unit, followed by a second request for the acknowledgment message.

21 Claims, 3 Drawing Sheets

-PRIOR ART-

METHOD AND APPARATUS IN A WIRELESS COMMUNICATION SYSTEM FOR EXPEDITING A REQUEST FOR UPLINK RESOURCES

FIELD OF THE INVENTION

This invention relates in general to wireless communication systems, and more specifically to a method and apparatus in such a wireless communication system for expediting a request from a mobile unit for uplink resources.

BACKGROUND OF THE INVENTION

In a wireless communication system, such as the General Packet Radio Service (GPRS), the Base Station System (BSS) can request a Packet Downlink Ack/Nack (PDAK) by polling on a downlink data block. The mobile can then request uplink resources, when needed, by sending a channel request in the PDAK. After sending a channel request, the mobile will start a first timer. The value for the duration of the first timer is set by the network in system information messages. In GPRS, it can range from a minimum of 500 ms to a maximum of 4 seconds (e.g., for heavily congested systems). If the mobile does not receive a Packet Uplink Resource Assignment (PUA) after sending a channel request in the PDAK, the mobile will not send a new channel request in another PDAK until either the first timer expires or a Packet Access Reject message (PAR) is received. The reason for not allowing a new channel request before the first timer expires is to prevent the mobile unit from sending multiple channel requests in a rapid sequence before the base station has had time to respond to the original channel request, thereby potentially overloading the base station with the additional, unnecessary channel requests. In the prior-art GPRS, the Packet Access Reject message (PAR) is sent only when the system is congested and there are no more uplink resources available to allocate to a mobile that is requesting uplink access through a channel request in the PDAK. Upon receipt of the PAR, the mobile starts a second timer for a duration of a WAIT_INDICATION value sent with the PAR by the network. The mobile is not allowed to make another attempt for packet access in the same cell until the second timer expires. It may attempt packet access in another cell after a successful cell reselection.

Under certain circumstances, this can cause the following problem. If a PDAK containing a channel request is missed at the network (e.g., due to uplink interference), a new channel request will not be initiated for the duration of the first timer (500 ms to 4 sec). Depending upon the value of the first timer, the delay between the network missing the PDAK containing the channel request and the arrival of a first uplink data block (upon a successful uplink resource allocation on a next subsequent channel request in a PDAK received from the same mobile) will be in the range of 680 to 4180 ms (for the GPRS system). This will substantially degrade the data transfer rate.

Thus, what is needed is a method and apparatus in a wireless communication system for expediting a request from a mobile unit for uplink resources. The method and apparatus preferably will not require any modification to the protocol standards currently employed by the wireless communication system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PREFERRED EMBODIMENTS

In overview, the present disclosure concerns communications systems that utilize base stations to provide service for mobile units or more specifically for users thereof operating therein. More particularly, various inventive concepts and principles embodied as a method and apparatus in a base station of a wireless communication system for expediting a request from a mobile unit for uplink resources for use in equipment with such communications systems will be discussed and disclosed. The communications systems of particular interest are those being deployed and developed such as General Packet Radio Service (GPRS), Enhanced GPRS (EGPRS), and Universal Mobile Telecommunications Service (UMTS) systems and evolutions thereof, although the concepts and principles have application in other systems and devices, as well.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional processors, or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such processors or generating such ICs with minimal experimentation. Therefore, in the interest of brevity and minimization of any risk of obscuring the principles and concepts according to the present invention, further discussion of such processors and ICs, if any, will be limited to the essentials with respect to the principles and concepts employed by the preferred embodiments.

Figure 1:
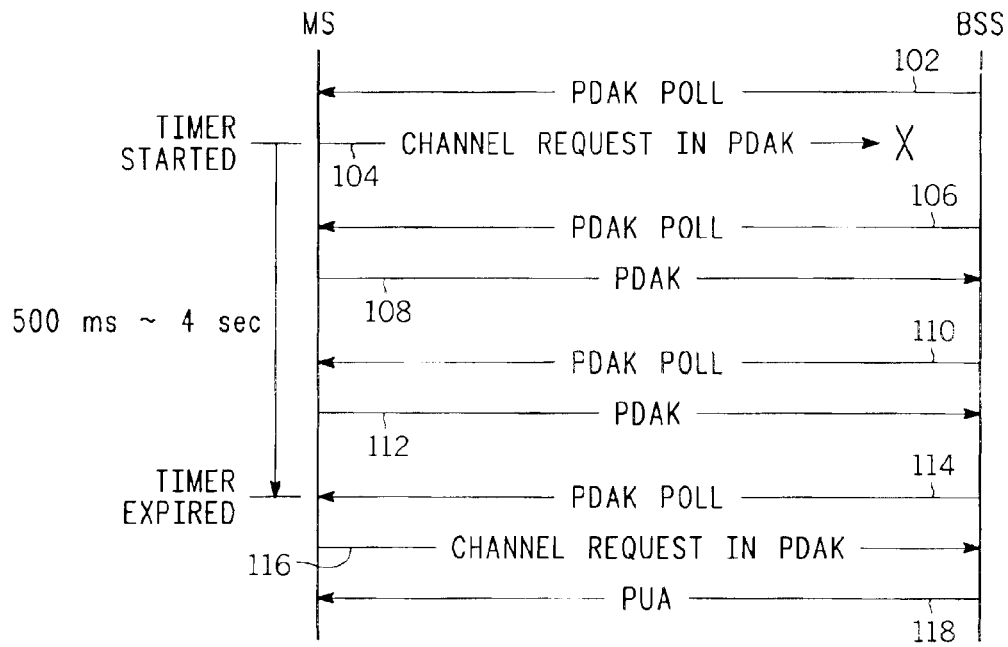
FIG. 1 is a timing diagram depicting an operational problem in a prior-art wireless communication system.

Referring to FIG. 1, an example timing diagram 100 depicts an operational problem in a prior-art wireless communication system. The terminology and parameter values selected to explain the operational problem are those of the current General Packet Radio Service. It will be appreciated that other similar wireless data communication systems may exhibit a similar operational problem, but will likely use somewhat different terminology and parameter values.

The timing diagram 100 begins with the Base Station System (BSS), hereinafter referred to as the base station, sending on a downlink to a mobile unit a Packet Downlink Ack/Nack (PDAK) poll 102 requesting an acknowledgment message from the mobile unit, the acknowledgment message able to include an uplink channel request when needed by the mobile unit. PDAK polls are sent periodically to the mobile, the periodicity dependent upon traffic conditions.

In this example, the mobile unit needs uplink resources, so it responds to the PDAK poll 102 by transmitting on an uplink a channel request 104 in a PDAK. Concurrent with transmitting the channel request 104, the mobile unit starts a first timer having a duration value of 500 ms to 4 seconds, set by the communication system. The first timer will prevent the mobile unit from sending an additional channel request until the first timer expires, or until the mobile receives a packet access reject (PAR) indicating that there are currently no uplink resources available to assign to the mobile. When received, the PAR contains a WAIT_INDICATION value, which, in effect, stops the first timer and starts a second timer having a duration equal to the WAIT_INDICATION value. The second timer also will prevent the mobile unit from sending an additional channel request until the second timer expires.

Unfortunately, in the example timing diagram 100, the channel request 104 is not received by the base station (e.g., due to uplink interference). The base station thus does not send anything to the mobile unit until it is time for a next PDAK poll 106. The mobile unit responds to the PDAK pole by sending a PDAK 108, but without a channel request, because the first timer has not expired. Again, the base station sends another PDAK pole 110 to the mobile unit, which again responds by sending a PDAK 112 without a channel request, because the first timer still has not expired. The base station sends yet another PDAK pole 114 to the mobile unit. At this point the first timer has expired, and the mobile unit responds to the PDAK poll 114 by transmitting a channel request 116 in a PDAK. This time, the base station receives the channel request and returns a Packet Uplink Resource Assignment (PUA) 118 to the mobile. While it is true that the mobile finally managed to receive the desired PUA, the effect of the first timer has been to delay the PUA substantially, thereby substantially degrading the data rate.

Figure 2:
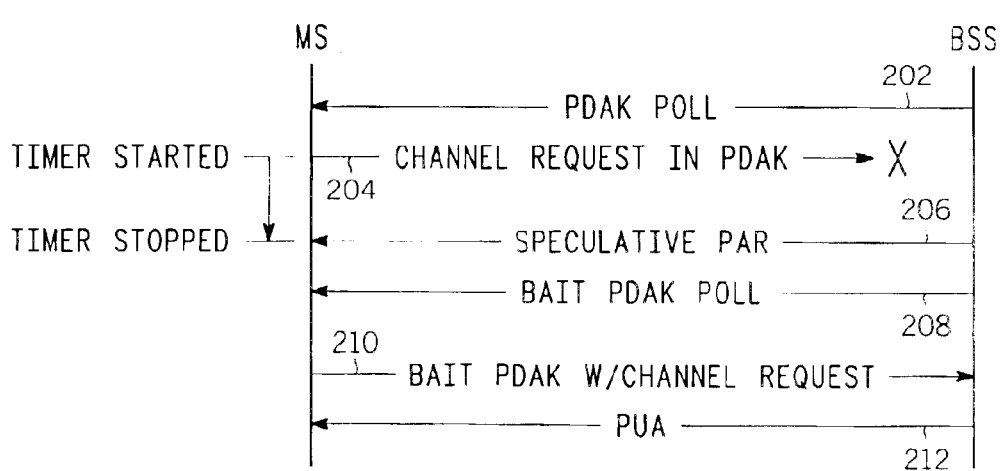
FIG. 2 is a timing diagram depicting a solution to the operational problem, in accordance with the present invention.

Referring to FIG. 2, a timing diagram 200 depicts a solution to the operational problem described herein above, in accordance with the present invention. The timing diagram 200 begins with the base station sending to a mobile unit a PDAK poll 202 requesting an acknowledgment message from the mobile unit, the acknowledgment message able to include an uplink channel request when needed by the mobile unit.

In this example, the mobile unit needs uplink resources, so it responds to the PDAK poll 202 by transmitting a channel request 204 in a PDAK. Concurrent with transmitting the channel request 204, the mobile unit starts a first timer having a duration value of 500 ms to 4 seconds, set by the communication system. The first timer will prevent the mobile unit from sending an additional channel request until the first timer expires, or until the mobile receives a packet access reject (PAR) indicating that currently there are no uplink resources available to assign to the mobile. When received, the PAR contains a WAIT_INDICATION value, which, in effect, stops the first timer and starts a second timer having a duration equal to the WAIT_INDICATION value. The second timer also will prevent the mobile unit from sending an additional channel request until the second timer expires.

As in the previous example, the channel request 204 is not received by the base station (e.g., due to uplink interference). The base station, however, is aware that it has sent the PDAK poll to the mobile unit and can easily determine, through well-known techniques, an expected time by which the acknowledgment message from the mobile should be received at the base station, if all goes according to plan. When the acknowledgment message including the uplink channel request has not been received by the base station by the expected time, the base station responds by conditionally sending to the mobile unit a "speculative" Packet Access Reject (PAR) message 206, in accordance with the present invention. The conditions under which the base will send the speculative PAR will be disclosed further herein below.

The speculative PAR 206 is preferably a normal PAR message in accordance with the protocol standards employed by the communication system, and is set by the system to have a very small WAIT_INDICATION value, e.g., a value of zero. It is important to emphasize that in the prior-art system, the PAR message is sent in response to a received uplink channel request and only when the system is congested and there are no more uplink resources available to allocate to the requesting mobile. In the situation described herein above, the uplink channel request sent by the mobile was not received by the base station, and the system is not congested, so the prior-art system would not send a PAR message under these conditions. One exemplary embodiment of the speculative PAR, in accordance with the present invention, will now be described further.

First, an explanation of why the speculative PAR is called "speculative" is in order. This is because the base station is aware of the operational status of the mobile unit (more on this later). Furthermore, the base station is aware that it has not received the requested acknowledgment message from the mobile unit by the expected time. Given the operational status of the mobile unit, the base station is able to speculate about the likelihood that the missed PDAK included a channel request. If the likelihood is high, the base station will send the speculative PAR.

When the mobile unit receives the speculative PAR, it will immediately stop the first timer and set the duration of the second timer to the WAIT_INDICATION value, preferably zero, sent in the speculative PAR. Voila! The mobile unit is now primed to send another uplink channel request as soon as it receives another PDAK poll from the base station.

Referring again to the timing diagram 200, the base station next sends to the mobile a "bait" PDAK poll 208. The bait PDAK poll 208 preferably is a standard PDAK poll in accordance with the protocol employed by the communication system, and is sent in the next downlink timeslot available for communication with the mobile unit. The mobile unit responds to the bait PDAK poll 208 by sending a standard PDAK message 210 including when needed, the uplink channel request. The base station responds by sending a Packet Uplink Resource Assignment (PUA) 212 to the mobile.

By sending the speculative PAR 206 and the bait PDAK poll 208 as just described, the base station in accordance with the present invention advantageously reduces the time required to establish uplink traffic flow (in GPRS) by at least 360 ms and potentially up to 3880 ms, depending upon the duration value of the first timer in the mobile unit, as set by the communication system. This can substantially increase the effective data rate of the communication system.

Figure 3:
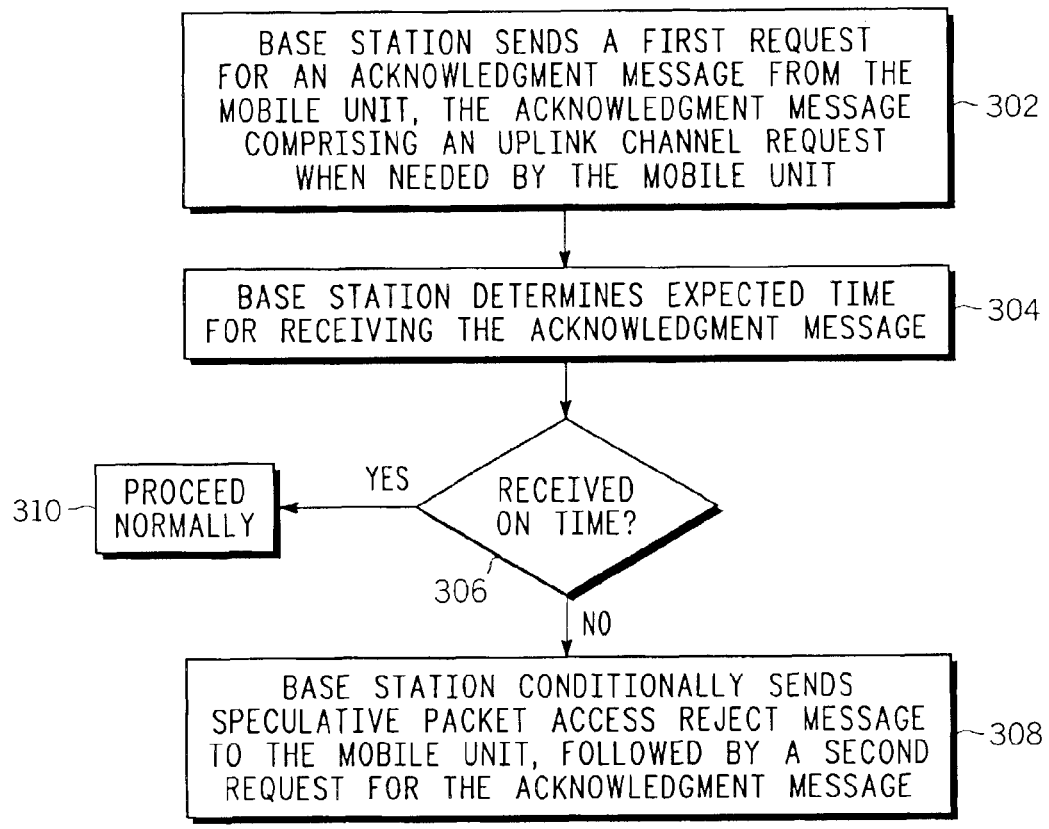
FIG. 3 is a flow diagram depicting an exemplary method for expediting a request from a mobile unit for uplink resources in accordance with the present invention.

Referring to FIG. 3, a flow diagram 300 depicts an exemplary method for expediting a request from a mobile unit for uplink resources. The flow begins with the base station sending 302 a first request for an acknowledgment message from the mobile unit, the acknowledgment message comprising an uplink channel request when needed by the mobile unit. The base station next determines 304 an expected time for receiving the acknowledgment message. The expected time can, for example, be determined by adding a known round-trip delay time to the current time of day. The base station monitors the uplink to check 306 whether the acknowledgment message has been received by the expected time. If so, the base station proceeds normally 310, e.g., processing the acknowledgment message according to its contents.

On the other hand, if the acknowledgment message has not been received by the expected time, the base station sends or preferably conditionally sends a speculative packet access reject message (PAR) to the mobile unit, followed by a second request for the acknowledgment message (bait poll). Here "conditionally sends" means "sends when certain specified conditions are met." In general, the base station conditionally sends the speculative packet access reject message only when the mobile unit is not actively transmitting uplink data, and no uplink channel request is queued for the mobile and waiting to be processed. In addition, the base station preferably conditionally sends the speculative packet access reject message only when the base station is not waiting for the mobile unit to retransmit the uplink channel request, in response to an earlier-sent speculative packet access reject message and second request. Here, "not waiting for" implies that the expected time for receiving the response to the second request has not yet arrived.

In one embodiment, the system is programmed with a maximum number of sequential speculative packet access reject messages allowed during a predefined downlink data flow. In that embodiment, the base station sends the speculative packet access reject message only when the maximum number of sequential speculative packet access reject messages allowed during the predefined downlink data flow has not been reached. It will be appreciated that the maximum number can be a function of the number of mobile units doing active downlink data transfers on a given timeslot.

In another embodiment, the base station sends the speculative packet access reject message only when a downlink temporary block flow (i.e., downlink data being sent to the mobile unit) is one of: (a) operating in a delayed downlink release mode, and (b) operating within a predetermined time of beginning the delayed downlink release mode. In the delayed downlink release mode, the base station has completed sending actual data and has begun sending dummy blocks for a predetermined duration. This keeps the downlink established long enough for the mobile to request new uplink resources for acknowledging the received downlink data.

In yet another embodiment, the base station sends the speculative packet access reject message only when the mobile unit has subscribed to a Quality of Service (QoS) greater than a predetermined level. In other words, in this embodiment, the user of the mobile unit, perhaps in exchange for higher payments, can get the higher data rate provided in accordance with the present invention.

Figure 4:
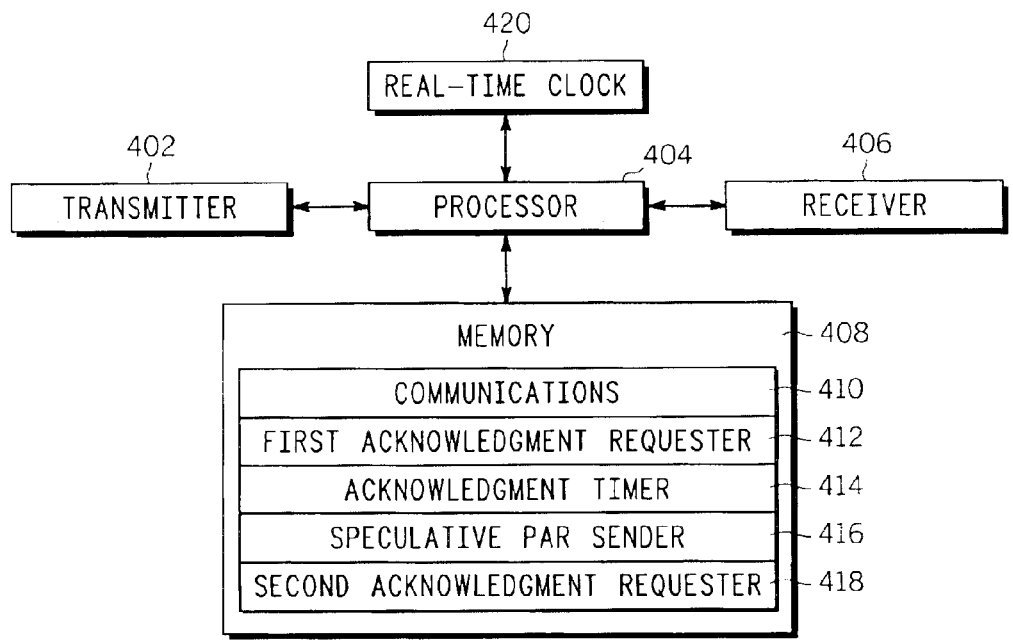
FIG. 4 is an electrical block diagram of an exemplary base station in accordance with the present invention.

Referring to FIG. 4, an electrical block diagram depicts an exemplary base station 400 in accordance with the present invention. The base station 400 comprises a conventional transmitter 402 that sends a first request for an acknowledgment message from a mobile unit, the acknowledgment message able to carry an uplink channel request when needed by the mobile unit. The base station 400 further comprises a conventional processor 404 coupled to the transmitter 402 for controlling the transmitter 402, and a conventional receiver 406 coupled to the processor 404 for attempting to receive the acknowledgment message. In addition, the base station preferably includes a real-time clock 420, e.g., a conventional Global Positioning System receiver, for accurately determining the current time of day. The base station 400 also includes a conventional memory 408 that stores executable software programs for advantageously programming the processor 404 in accordance with the present invention. The transmitter 402 and the receiver 406 are preferably similar to those utilized in the base stations of the GPRS communication systems available from Motorola, Inc. and others. The processor 404 is preferably a member of the MC68000 family of processors available from Motorola, Inc. It will be appreciated that, alternatively, other similar types of receivers, transmitters, and processors can be utilized in the base station 400. It will be further appreciated that all or portions of the real-time clock 420, the processor 404, and the memory 408 can be fabricated as a custom integrated circuit.

The memory 408 comprises a conventional communications program 410 for programming the processor 404 to communicate according to a desired communication protocol standard, e.g., the GPRS protocol standard or other protocols with similar functionality. The memory 408 further comprises a first acknowledgment requester program 412 for programming the processor 404 to control the transmitter 402 to send the first request for the acknowledgment message. The memory 408 also includes an acknowledgment timer program 414 for programming the processor 404 to determine an expected time for receiving the acknowledgment message. In addition, the memory 408 includes a speculative PAR sender 416 for programming the processor 404 to control the transmitter 402, in response to not receiving the acknowledgment message by the expected time, to conditionally send a speculative packet access reject message to the mobile unit. The conditions for sending the speculative PAR are those disclosed herein above in the description of the flow chart 300. The memory 408 further includes a second acknowledgment requestor program 418 for programming the processor 404 to send a second request for the acknowledgment message following the speculative PAR.

Figure 5:
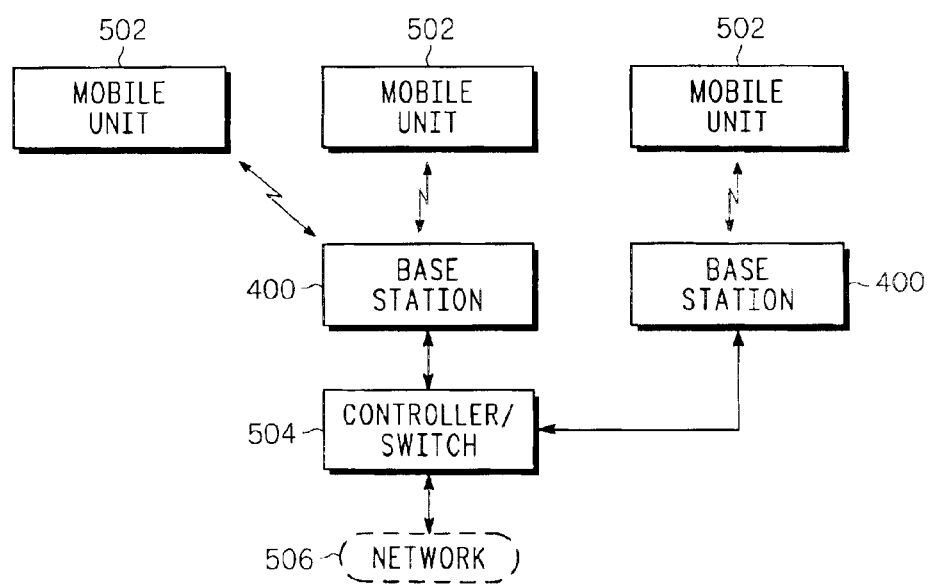
FIG. 5 is an electrical block diagram of an exemplary wireless communication system in accordance with the present invention.

Referring to FIG. 5, an electrical block diagram depicts an exemplary wireless communication system 500. The communication system 500 comprises a plurality of conventional mobile units 502, e.g., the mobile units employed in the GPRS communication systems available from Motorola, Inc. and others. The communication system 500 further comprises at least one of the base stations 400 coupled wirelessly to the plurality of mobile units 502. In addition, the communication system 500 includes a conventional controller/switch 504 coupled to the at least one of the base stations 400. The controller/switch 504 is preferably similar to those utilized in the GPRS communication systems available from Motorola, Inc. and others. In addition, the communication system 500 can be optionally coupled to a network 506, e.g., a private data network or the Internet for communicating therewith. The communications system 500 can advantageously utilize the principles and concepts disclosed and discussed above to expedite services for the mobile units, provided the base stations 400 are constructed, arranged and configured to operate in accordance with these principles and concepts.

Thus, it should be clear from the preceding disclosure that the present invention provides a method and apparatus in a base station of a wireless data communication system for expediting a request from a mobile unit for uplink resources. The method and apparatus advantageously does not require any modification to the protocol standards currently employed by the wireless data communication system.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a base station of a wireless data communication system for expediting a request from a mobile unit for uplink resources, the method comprising:

sending by the base station a first request for an acknowledgment message from the mobile unit, the acknowledgment message comprising an uplink channel request when needed by the mobile unit;

determining by the base station an expected time for receiving the acknowledgment message; and in response to not receiving the acknowledgment message by the expected time, sending by the base station a speculative packet access reject message to the mobile unit, followed by a second request for the acknowledgment message.

2. The method of claim 1, wherein the sending by the base station the speculative packet access reject message further comprises conditionally sending the speculative packet access reject message only when the mobile unit is not actively transmitting uplink data.

3. The method of claim 1, wherein the sending by the base station the speculative packet access reject message further comprises conditionally sending the speculative packet access reject message only when no uplink channel request is queued for the mobile and waiting to be processed.

4. The method of claim 1, wherein the sending by the base station the speculative packet access reject message further comprises conditionally sending the speculative packet access reject message only when the base station is not waiting for the mobile unit to retransmit the uplink channel request, in response to an earlier-sent speculative packet access reject message and second request.

5. The method of claim 1, wherein the sending by the base station the speculative packet access reject message further comprises conditionally sending the speculative packet access reject message only when a maximum number of sequential speculative packet access reject messages allowed during a predefined downlink data flow has not been reached.

6. The method of claim 1, wherein the sending by the base station the speculative packet access reject message further comprises conditionally sending the speculative packet access reject message only when a downlink temporary block flow is one of: operating in a delayed downlink release mode, and operating within a predetermined time of beginning the delayed downlink release mode.

7. The method of claim 1, wherein the sending by the base station the speculative packet access reject message further comprises conditionally sending the speculative packet access reject message only when the mobile unit has subscribed to a Quality of Service (QoS) greater than a predetermined level.

8. An apparatus for use in a base station of a wireless data communication system for expediting a request from a mobile unit for uplink resources, the apparatus comprising:

a transmitter for sending by the base station a first request for an acknowledgment message from the mobile unit, the acknowledgment message comprising an uplink channel request when needed by the mobile unit;

a receiver for receiving the acknowledgment message, and a processor for controlling the transmitter and the receiver; wherein the processor is programmed to:

determine an expected time for receiving the acknowledgment message; and in response to not receiving the acknowledgment message by the expected time, conditionally send a speculative packet access reject message to the mobile unit, followed by a second request for the acknowledgment message.

9. The apparatus of claim 8, wherein the processor is programmed to send the speculative packet access reject message only when the mobile unit is not actively transmitting uplink data.

10. The apparatus of claim 8, wherein the processor is programmed to send the speculative packet access reject message only when no uplink channel request is queued for the mobile and waiting to be processed.

11. The apparatus of claim 8, wherein the processor is programmed to send the speculative packet access reject message only when the base station is not waiting for the mobile unit to retransmit the uplink channel request, in response to an earlier-sent speculative packet access reject message and second request.

12. The apparatus of claim 8, wherein the processor is programmed to send the speculative packet access reject message only when a maximum number of sequential speculative packet access reject messages allowed during a predefined downlink data flow has not been reached.

13. The apparatus of claim 8, wherein the processor is programmed to send the speculative packet access reject message only when a downlink temporary block flow is one of:

operating in a delayed downlink release mode, and operating within a predetermined time of beginning the delayed downlink release mode.

14. The apparatus of claim 8, wherein the processor is programmed to send the speculative packet access reject message only when the mobile unit has subscribed to a Quality of Service (QoS) greater than a predetermined level.

15. A base station in a wireless data communication system for expediting a request from a mobile unit for uplink resources, the base station comprising:

a transmitter to send a first request for an acknowledgment message from the mobile unit, the acknowledgment message able to carry an uplink channel request when needed by the mobile unit;

a receiver to receive the acknowledgment message when provided; and a processor to control the transmitter and the receiver; wherein the processor is programmed to:

determine an expected time for receiving the acknowledgment message; and in response to not receiving the acknowledgment message by the expected time, conditionally send a speculative packet access reject message to the mobile unit, followed by a second request for the acknowledgment message.

16. The base station of claim 15, wherein the processor is programmed to send the speculative packet access reject message only when the mobile unit is not actively transmitting uplink data.

17. The base station of claim 15, wherein the processor is programmed to send the speculative packet access reject message only when no uplink channel request is queued for the mobile and waiting to be processed.

18. The base station of claim 15, wherein the processor is programmed to send the speculative packet access reject message only when the base station is not waiting for the mobile unit to retransmit the uplink channel request, in response to an earlier-sent speculative packet access reject message and second request.

19. The base station of claim 15, wherein the processor is programmed to send the speculative packet access reject message only when a maximum number of sequential speculative packet access reject messages allowed during a predefined downlink data flow has not been reached.

20. The base station of claim 15, wherein the processor is programmed to send the speculative packet access reject message only when a downlink temporary block flow is one of:

operating in a delayed downlink release mode, and operating within a predetermined time of beginning the delayed downlink release mode.

21. The base station of claim 15, wherein the processor is programmed to send the speculative packet access reject message only when the mobile unit has subscribed to a Quality of Service (QoS) greater than a predetermined level.

* * * * *